United States Patent [19]

Vignaud

[11] 4,450,211

[45] May 22, 1984

[54] ELECTROCHEMICAL GENERATOR COMPRISING A THIN GAS ELECTRODE

[75] Inventor: René Vignaud, Aulnay-Sous-Bois, France

[73] Assignee: Societe les Piles Wonder, Saint-Quen, France

[21] Appl. No.: 367,992

[22] Filed: Apr. 13, 1982

[30] Foreign Application Priority Data

Apr. 13, 1981 [FR] France ................... 81 07409

[51] Int. Cl.³ .......................................... H01M 12/06
[52] U.S. Cl. .......................................... 429/27; 429/28
[58] Field of Search ....................... 429/27, 28, 165, 29

[56] References Cited

U.S. PATENT DOCUMENTS

| | | | |
|---|---|---|---|
| 2,641,623 | 6/1953 | Winckler et al. | 429/28 |
| 3,594,234 | 7/1971 | Lang et al. | 429/28 |
| 3,647,550 | 3/1972 | Kober et al. | 429/28 |
| 3,963,519 | 6/1976 | Louie | 429/29 |
| 4,054,725 | 10/1977 | Tuburaya | 429/29 |

FOREIGN PATENT DOCUMENTS

| | | |
|---|---|---|
| 1457130 | 9/1966 | France . |
| 1455261 | 10/1966 | France . |
| 2060759 | 6/1971 | France . |
| 2193264 | 2/1974 | France . |
| 2251109 | 6/1975 | France . |

*Primary Examiner*—Donald L. Walton
*Attorney, Agent, or Firm*—Fleit, Jacobson, Cohn & Price

[57] ABSTRACT

An electrochemical generator is provided, more especially a cell or battery of the metal/air type, comprising a thin positive air electrode 1 forming cathode and having a shape such that it leaves available a space which it partially surrounds, a current collector 2 associated with this positive electrode, an anode mass 4 disposed inside this positive electrode in said available space, a second current collector 5 associated with this anode mass and possible a separator 6 between said anode mass and said positive electrode, characterized in that said positive electrode has the shape of a glove finger or bell.

5 Claims, 2 Drawing Figures

ELECTROCHEMICAL GENERATOR COMPRISING A THIN GAS ELECTRODE

The present invention relates to electrochemical generators or devices, more especially cells and batteries of the metal/air type comprising a thin gas electrode.

It relates more particularly to metal/air primary cells or batteries comprising:

a thin positive electrode or cathode comprising active compounds, formed by at least one compound with electrocatalytic activity for reducing the oxygen of the air into hydroxyl ions and possibly by at least one compound presenting electronic conductivity, and a water-repellent product formed generally by polytatrafluorethylene;

a first current collector in contact with the positive electrode;

an anode mass, forming a negative electrode and constituted by oxidizable metal particles and a saline or preferably alkaline electrolyte;

a second current collector in contact with the anode mass; and generally a separator between the anode mass and the positive electrode or cathode, this separator being permeable to the hydroxyl ions which may thus reach the anode mass and allow oxidation of the metal particles.

A metal/air cell is known from French Pat. No. 2 105 424, which comprises a positive cylindrical tubular electrode in a membrane made from water-repellent polymer and permeable to gases, for example polytatrafluorethylene, which membrane is coated on its internal surface with an electrocatalytic layer, formed for example from silver particles in a bonding agent of polytetrafluorethylene particles; a metal screen, advantageously constituted by a nickel gauze, which is embedded in the layer of the catalyst for example, forms the first current collector. As for the anode mass, forming the negative electrode, it is housed inside the cylindrical tube and it is made from zinc powder (which will become zinc oxide through oxidation during operation) and from a suitable electrolyte, such as potash in gel or paste form; a second current collector plunges into this anode mass. A separator, for example made from treated paper, is in intimate contact with the electrocatalytic surface of the positive electrode. Two insulating disks, made from rubber or from a plastic material, are disposed at both ends of the cylindrical tube and serve to enclose the anode mass and to prevent any leak of the electrolyte, by mechanical clamping of the disks against the ends of the cylindrical tube. Finally, two metal plates connected respectively to the first and to the second current collector are each disposed on one of the insulating disks to form the positive and negative poles of the cell.

It should be noted that in such a primary cell and similar metal/air cells or batteries of the prior technique:

the positive electrode or cathode and its current collector are formed by separate elements, the collector being manufactured separately;

sealing, which must exist at both ends of the positive electrode formed by a cylindrical tube open at both its ends, is difficult to obtain by means of two insulating disks closing said tube at both its ends.

Experience has in fact proved that between two parts (one end of the tube and an insulating disk) sealing is very often insufficient for there remains a small-sized channel whose walls are wetted by the electrolyte, such as potash, with the risk of electrolyte leaking outside the cell and all the harmful consequences that that may entail (the cell becomes unusable and the surrounding metal parts are attacked by the electrolyte).

Since the likelihood of possible leaks in a metal/air generator increases with the length of the sealing junction with the cathode enclosing the anode mass, it is advantageous that this length be reduced.

The invention has consequently as its aim to reduce this length.

To this end, the Applicant has come up with the idea of giving to the positive electrode or cathode of such a generator the shape of a receptacle closed as much as possible with a single opening (instead of two), which opening permits introduction inside the positive electrode of the anode mass and of the second current collector associated with this mass.

The invention has then as object an electrochemical generator, more especially a cell or battery of the metal-/air type comprising a thin positive air electrode forming cathode and having a form such that it leaves available a space which it partially surrounds, a first current collector associated with this positive electrode, an anode mass disposed inside this positive electrode in said available space, a second current collector associated with this anode mass and possibly a separator between said anode mass and said positive electrode, characterized in that said positive electrode has the form of a glove finger or a bell.

Preferably, this positive electrode is formed by a tube of revolution (having advantageously a slightly truncated cone shape), closed at one of its ends (namely, the one having the smallest diameter in the case of a slightly truncated cone shape) by means of a hemispherical cap which forms a single piece with the tube.

Advantageously, the top of said cap is crowned with a solid cylindrical nipple.

According to a particularly advantageous arrangement, the positive electrode is manufactured by the process described in the patent application Ser. No. 367,993, filed Apr. 13, 1982 for "Process for manufacturing thin electrodes, particularly gas electrodes, for electrochemical devices and thin electrodes obtained by this process, the electrodes being able to be provided with current collectors".

More particularly still, the positive electrode and the first current collector which is associated therewith are constructed as a unit assembly, as described in the above-mentioned patent.

According to the preferred embodiments:

the second current collector is disposed along the axis of revolution of said tube inside the anode mass;

the open end of said tube, once filled with the anode mass and the second current collector associated with this mass, is closed by a cover whose peripheral flange sealingly surrounds said open end;

the assembly of the positive electrode—with the first collector, filled with the anode mass and the second collector—and said cover is housed in a rigid case pierced with at least one aperture allowing air to have access inside the case against the outer surface of the positive electrode.

The invention will in any case be well understood with the complement of description which follows, as well as the accompanying drawings, which complement and drawings are of course given especially by way of indication.

Figure 1:
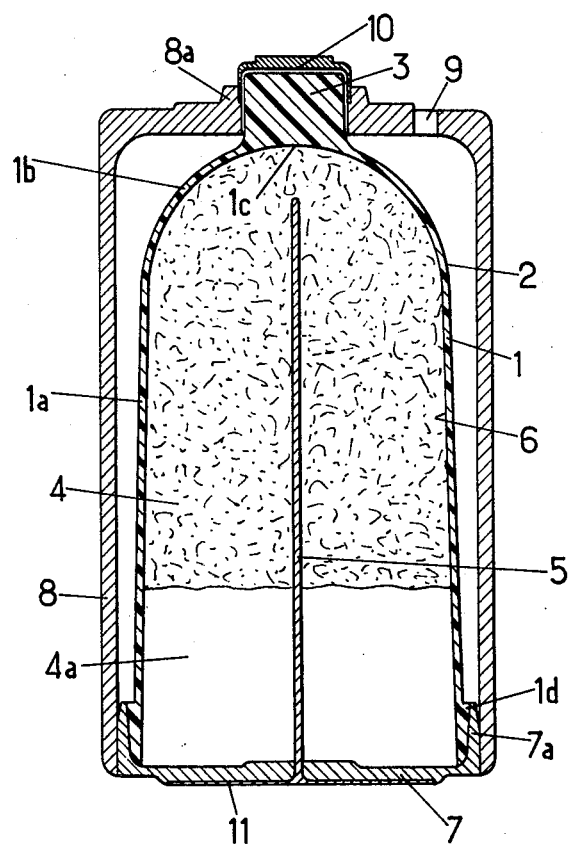
FIG. 1 is a sectional view of one embodiment, given by way of non limiting example, of a generator having the improvements of the invention.

Referring first of all to FIG. 1, it can be seen that the metal/air generator comprises a positive electrode or cathode 1, a first current collector 2 associated with this electrode 1 which comprises a protuberance 3, an anode mass 4 (under which is located an expansion chamber 4a allowing the anode mass 4 to swell during operation of the generator), a second current collector 5 associated with this mass, a separator 6, a cover 7, a case 8 pierced with at least one hole 9 and two poles or contacts 10 and 11.

More precisely and in accordance with the main feature of the invention, the positive electrode 1 has, as illustrated, the shape of a receptacle or bell formed preferably by a first tubular part 1a, cylindrical or having preferably a slightly truncated cone shape, the larger diameter portion being in the lower part of FIG. 1, and a second part 1b in the form of a hemispherical cap in the extension of the smaller diameter portion of the tube if this latter has a truncated cone shape. The two parts 1a and 1b form in fact a single integral part 1, which is the positive electrode or cathode of the generator. This part 1 comprises a button or nipple 3 disposed at the top part of cap 1b.

Preferably electrode 1 is formed in accordance with the process described in the above-mentioned patent application, namely a process consisting in preparing an homogeneous mixture of dry particles of active compounds (formed at least by one compound with electrocatalytic activity and possibly one compound presenting electronic conductivity) and particles formed by dry polytetrafluorethylene fibers and having an average size of 0.5 mm, obtained by coagulation of a polytetrafluorethylene emulsion, adding a lubricant and possible a surfactant so as to cause coating of the particles of the mixture by the lubricant and shaping the lubricated particles of the mixture.

By way of example, the mixture may be formed by 45 parts by weight of polytetrafluorethylene (PTFE) of ICI type CD and 55 parts by weight of carbon catalyzed with manganese dioxide and shaped, having a wall thickness of the order of 0.5 mm.

One of the two following compositions may be used (the parts being given by weight):

Composition a:
  60 parts of "Soreflon" 6-20 PTFE
  6 parts of graphite
  4 parts of electronic conducting carbon black
  30 parts of silver catalyzed carbon.

Composition b:
  60 parts of Hoechst series 2000 PTFE
  8 parts of conducting carbon
  32 parts of active carbon catalyzed with a manganese spinel.

The slight conicity of the positive electrode 1, because of its truncated cone shaped part 1a, presents the advantage of facilitating construction thereof by using the above-mentioned process, ensures a better contact between separator 6 and the anode mass 4 by interfitting of the truncated cone shaped surfaces and improves ventilation of the external wall of electrode 1 through holes 9 provided in case 8 of the cell.

The electronic conductibility of the positive electrode 1 is improved by the presence of a current collector 2 comprising a metal electronic conductor, made from nickel preferably or else from iron, silver, copper, gold, these metals being used alone or from an alloy or Monel alloy.

Collector 2 may be formed by a metal grid or an expanded metal or else a perforated metal sheet incorporated, during moulding, in the paste of electrode 1. However, collector 2 is preferably formed by a porous metal film of a thickness between 0.01 and 1 mm, preferably of the order of 0.05 mm, covering uniformly the surface of electrode 1.

This collector 2 is preferably formed in accordance with the process described in the above-mentioned patent application, which process consists in depositing on the external surface of electrode 1 a thin porous metal film adhering to the electrode, preferably by electroplating but may be formed by chemical deposition, by cathode spraying or by a schoop process.

Such a film has the advantage of presenting a porosity having a pore diameter less than 0.5 mm, with a permeability greater than 100 cm/h. This film, although superficial, is incrusted in the microporosity of the surface of electrode 1 from which it is inseparable, short of destroying either the film 2 or electrode 1.

There may be provided, as indicated in said patent application, a current collector 2 not having a uniform surface, but with thicker portions, for example in the form of ribs.

The anode mass 4 is formed by a mixture of metal elements, for example a metal powder of iron, cadmium, magnesium and/or aluminium; preferably the anode mass is made from zinc powder. The zinc powder or other metal is impregnated with an electrolyte which is either saline (ammonium chloride and/or sodium chloride) or alkaline (for example gelled by means of carboxymethylcellulose).

Separator 6 disposed between the positive electrode or cathode 1 and the anode mass 4 is formed for example from a non woven material of polyamide, a short staple artificial textile material or PVC, or a mixture thereof.

Case 8 is made from metal, for example steel, whereas cover 7 is formed from a plastic material such as polystyrene. To provide better sealing, a collar 1d may be provided about the free end of the truncated cone shaped part 1a of electrode 1. At its upper part, case 8 comprises a cylindrical recess for fitting nipple 3 therein.

Finally, the external current connections are provided by metal pieces 10 and 11 in electric contact respectively with collector 2 (in electric connection with cathode 1) and with current collector 5 (plunged in the anode mass 4).

The generator which has just been described presents first of all the advantage of very good sealing and great lightness because of the structure of the cathode 1-collector 2 assembly.

Furthermore, it is known that the so-called "alkaline" cells have higher capacities, particularly under discharge operation across a low value resistance (so-called "informative" operation) than so-called "saline" cells. A generator in accordance with the invention of the "alkaline" type has a capacity further increased with respect to the manganese dioxide "alkaline" cells, of the same size, of the prior technique.

Figure 2:
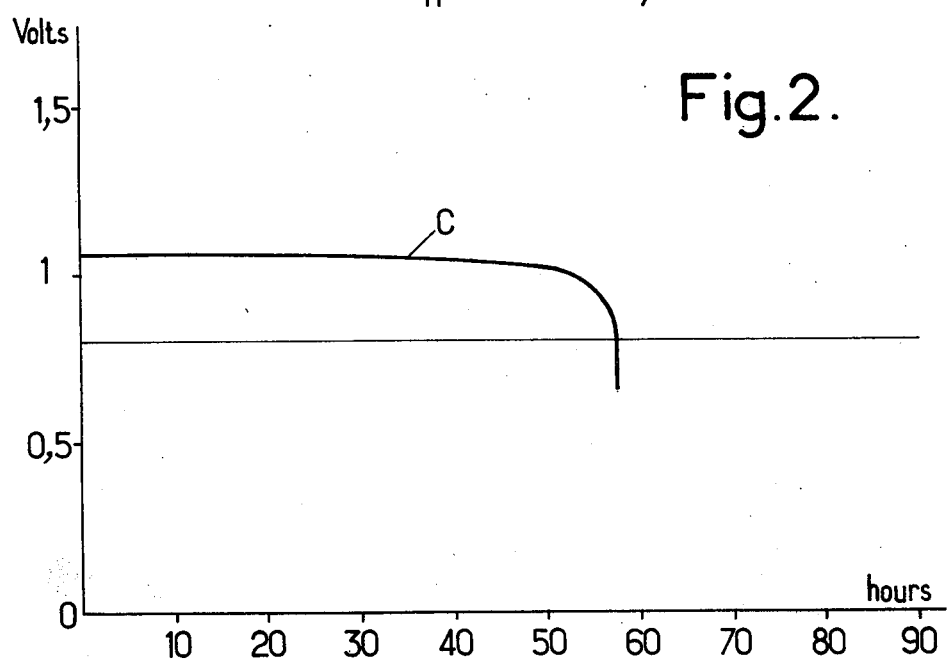
FIG. 2 shows the evolution of the voltage in volts plotted against the time in hours, during discharge of an R 20 size generator under informative operating conditions (continuous operation across a 3.9 ohm resistance).

In FIG. 2 there is shown the discharge curve C of an element of the invention, of R 20 size, under the severest operating conditions so-called "informative" across a 3.9 ohm resistance under continuous discharge; it was discovered that the discharge time reached 60 hours (vertical portion of curve C), whereas it is only about 30 hours for a manganese dioxide alkaline cell of conventional type. Curve C also shows the stability of the voltage level (slightly greater than 1 volt) during discharge of the cell.

A similar advantage is to be found in the case of discharge under so-called "slow" operating conditions.

Furthermore, a generator in accordance with the invention permits very simple and very rapid manufacture, especially when the positive electrode 1-collector 2 assembly is formed as described in said patent application (preferred embodiment of the invention).

As is evident and as it follows moreover already from what has gone before, the invention is in no wise limited to those of its modes of application and embodiments which have been more especially considered; it embraces, on the contrary, all variations thereof.

I claim:

1. Electrochemical generator of the metal/air type comprising:
   (a) a cylindrical container;
   (b) a thin positive air electrode constituting a cathode and being constituted by a slightly truncated conical portion, closed at its smaller diameter end by a substantially hemispherical cap portion, integral with said truncated cone portion, a solid cylindrical nipple crowning the hemispherical cap, said electrode being located inside said container at a certain distance from the internal surface of said container so as to leave a volume of air between said surface and the external surface of said electrode;
   (c) an anodic mass located inside said electrode, said mass occupying a substantial portion of the volume inside said electrode;
   (d) a first current collector associated with said electrode, said first current collector being constituted by a thin porous metallic film adhering on at least a part of the external surface of said electrode;
   (e) a second current collector associated with said anodic mass; and
   (f) a separator between said electrode and said anodic mass, said separator being applied against the internal surface of said electrode.

2. Electrochemical generator according to claim 1, wherein said container and said electrode are disposed around a common center axis and said second current collector is located along said center axis.

3. Electrochemical generator according to claim 1, wherein the larger diameter end of said slightly truncated conical portion is closed by a cover having a peripherically folded lip sealingly surrounding said end, and said container includes a folded end having a central aperture with a periphery surrounding said nipple and an open end surrounding said lip, at least one opening being provided in said container for providing the free access of air from the outside of said container to said volume between the internal surface of said container and said external surface of said electrode.

4. Electrochemical generator according to claim 1, wherein said cathode is formed by preparing an homogeneous mixture of dry particles of active compounds, formed by at least one compound with electrocatalytic activity and at least one compound presenting electronic conductivity, and particles obtained from dry polytetrafluorethylene fibers and having an average size of the order of 0.5 mm, obtained by coagulation of a polytetrafluorethylene emulsion, adding a lubricant so as to cause coating of the particles of the mixture by the lubricant, and shaping the lubricated particles of the mixture.

5. Electrochemical generator of the metal/air type comprising:
   (a) a cylindrical container;
   (b) a thin positive air electrode constituting a cathode wherein said electrode has a slightly truncated conical portion, closed at its smaller diameter end by a substantially hemispherical cap portion, integral with said slightly truncated conical portion, a solid cylindrical nipple crowning the hemispherical cap, said electrode being located inside said container at a certain distance from the internal surface of said container so as to leave a volume of air between said surface and the external surface of said electrode;
   (c) an anodic mass located inside said electrode, said mass occupying a substantial portion of the volume inside said electrode;
   (d) a first current collector associated with said electrode; and
   (e) a second current collector associated with said anodic mass.

* * * * *